I. HOLMES.
Carriage-Wheel.
No 4,918.
Patented Jan. 1, 1847.
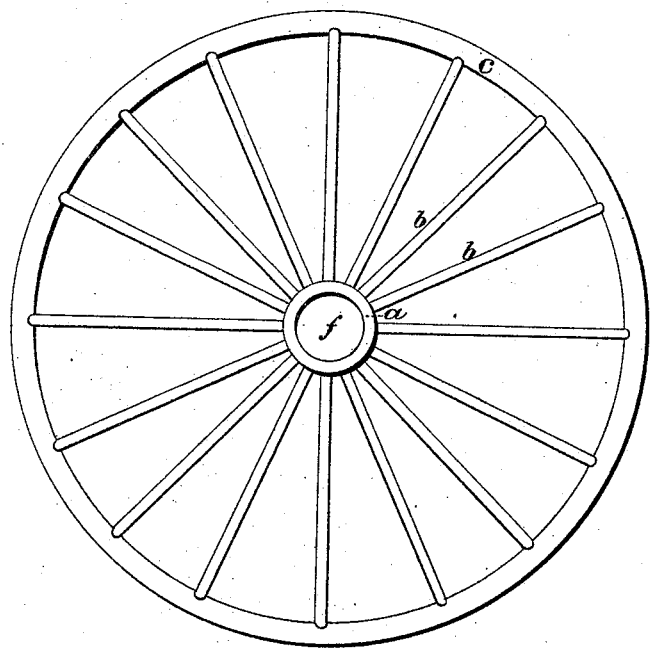
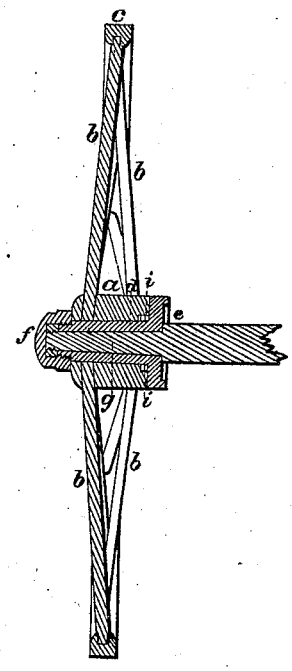
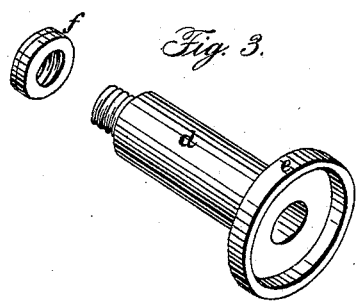

UNITED STATES PATENT OFFICE.

IRA HOLMES, OF MOSCOW, NEW YORK.

CARRIAGE-WHEEL.

Specification of Letters Patent No. 4,918, dated January 1, 1847.

*To all whom it may concern:*

Be it known that I, IRA HOLMES, of Moscow, in the county of Livingston and State of New York, have invented a new and useful Improvement in Carriage-Wheels, and that the following is a full, clear, and exact description of the principle or character which distinguishes it from all other things before known and of the manner of making, constructing, and using the same, reference being had to the accompanying drawings, making part of this specification, in which—

Figure 1 is an elevation of the face of the wheel; Fig. 2, a section through and parallel with the axis; and Fig. 3, a separate view of the inner hub that fits within the shell of the hub.

The same letters indicate like parts in all the figures.

In the construction of carriage wheels with metal hubs, spokes, and rims, the spokes with a head on one end and tapped on the other have been inserted either through the rim and screwed into the hub, or passed through holes in flanches projecting from the hub and screwed into the rim; but in these methods no provision has been made for preventing the jar of the wheel from unscrewing the spokes, nor has adequate provision been made for repairing the wheel readily and at little cost. These obvious defects are effectually remedied by my improvements which consist in inserting the spokes through a shell which constitutes the outer part of the hub, and screwing them into the rim, and then in preventing them from unscrewing by inserting within the shell of the hub an inner hub on which the heads of the spokes rest, and which runs on the axle, the inner hub being made to fit the shell or outer hub snugly with a shoulder on one end and a screw cap on the other, so that by simply taking out the inner hub the spokes can be removed and introduced and all other repairs made with facility and at very little cost.

In the accompanying drawings (*a*) represents a hollow metallic cylinder which constitutes the outer hub or shell, provided with a series of holes near each end which are reamed out or counter sunk on the inside to receive the heads of the spokes (*b*) that are passed through these holes and screwed into the rim (*c*) of the wheel. The two sets of spokes incline from the hub to the rim in opposite directions to form what is known as the double dished wheel, one set being in the middle of the spaces between those constituting the other set. The inner bore of the shell is slightly conical and to this is accurately fitted the inner hub (*d*), provided at its larger end with a shoulder or collar (*e*) and at the other with a screw cap nut (*f*) by which the two parts of the hub are securely held and bound together; the inner one at the same time securing the heads of the bolts which are thus prevented from unscrewing or becoming loose. To prevent the two parts of the hub from turning on each other, small projections or short feathers (*i*) are made on the inner part and near the collar which fit corresponding recesses in the outer part. The axle (*g*) is fitted to and works in the inner hub which may be boxed in any desired manner, and the cap screw nut (*f*) is made large enough to cover and to admit of the free working of the nut (*h*) or linch pin that retains the hub on the axle.

It will be obvious from the foregoing that instead of screwing the outer ends of the spokes into a metallic rim, they can be let into a wooden rim and there secured by nuts in manner well known to coach-makers: and that when the rim of the wheel is made of metal, it may be made with or without a tyre.

This wheel presents the advantages of great solidity as the spokes when inserted and secured by the insertion of the inner hub cannot become loose; all tendency to break out the ends of the outer hub or shell by the inclined bracing of the spokes is prevented by the collar and cap nut of the inner hub which embrace the wheel—the spokes when injured can be removed and repaired or others substituted by simply removing the inner hub and unscrewing them and screwing in others—and the inner hub, which, with or without extra boxing is the most liable to derangement and wear, can be removed and replaced with facility and at little expense.

What I claim as my invention and desire to secure by Letters Patent is—

The herein described method of inserting metallic spokes in carriage wheels in combination with the making of the hub in two parts one fitting within the other, substantially as herein described, whereby the spokes are firmly held in place and prevented from working loose by the jarring of the wheel, and also any one of them can be taken out for repairs and reinserted by making the hub in two parts as described.

IRA HOLMES.

Witnesses:
J. J. GREENOUGH,
A. P. BROWNE.